UNITED STATES PATENT OFFICE

WALTER KROPP AND STANISLAUS DEICHSEL, OF ELBERFELD, GERMANY, ASSIGNORS TO WINTHROP CHEMICAL COMPANY, INC., OF NEW YORK, N. Y., A CORPORATION OF NEW YORK

NEW SALT-LIKE COMPLEX COMPOUNDS OF THE HIGHER HOMOLOGOUS POLYHYDROXYBENZENES AND SUBSTITUTION PRODUCTS THEREOF

No Drawing. Application filed January 21, 1930, Serial No. 422,486, and in Germany January 28, 1929.

The present invention relates to new salt-like complex compounds of the higher homologous polyhydroxybenzenes and substitution products thereof.

The higher homologous polyhydroxybenzenes, obtainable according to the processes described by Dohme, Cox and Miller, Journ. of the Amer. Chem. Soc. 48 (1926), page 1688, are therapeutically valuable; however, when applied as medicines these products display a more or less caustic action and have such a disagreeable taste that they frequently cannot be dispensed per se to the patients.

In accordance with the present invention, these drawbacks are overcome or at least are greatly mitigated by causing the higher homologous polyhydroxybenzenes, preferably such ones as correspond to the general formula:

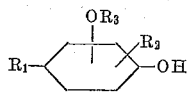

wherein $R_1$ stands for an aliphatic, alicyclic or aralkyl radical containing 6–12 carbon atoms, $R_2$ stands for H, OH or alkoxy, $R_3$ for H or alkyl, to combine with a basic compound of the group consisting of betaine and sarcosine anhydride. The acid phenolic component may be represented, for example, by the higher homologous resorcinols, such as hexyl-, heptyl-, octyl-, decyl-, isodecyl- and phenylethyl-resorcinol, or octyl- and decyl-pyrocatechol, decyl-pyrogallol, 2-methoxy-4-benzylphenol and the like.

We do not know the exact constitution of the new products, as we have found that for rendering the above indicated phenolic compounds tasteless and non-irritant, and for producing homogeneous molecular compounds, it is not necessary to apply always equivalent proportions of the components. The products obtained by the new process display improved properties already when containing only about ½ mol of the base.

It is assumed that the improved properties of the new products are particularly due to the salt formation; the new salts have the character of complex compounds. In these complex compounds, obviously varying molecular proportions of the components are capable of forming the salt-like products having improved properties; it seems to be possible that the new products sometimes are mixtures of different complex stages. Therefore, also such preparations as contain the components not in the molecular proportions are intended to be included in this invention.

The new process consists in causing a higher polyhydroxybenzene of the kind stated to react with betaine or sarcosine anhydride in the same manner as is used for a salt-forming process, for example, by melting together the components or by causing them to react in the presence of a solvent, such as chloroform, carbon tetrachloride, acetic acid ester, alcohol and the like, or by causing a double decomposition of the salts of the components in aqueous solution. The reaction products obtained are separated in the usual way, for example, by evaporating the solvent or by filtering off the precipitated salts.

The new double compounds generally are pulverizable, white or weakly colored products which generally can easily be pressed into tablets. The caustic action and the disagreeable taste of the phenolic components are completely removed or at least strongly reduced. For example, decyl-resorcinol displays irritating (caustic) taste; the betaine compounds thereof are, on the other hand, nearly tasteless. Other polyhydroxybenzenes behave in a similar manner; for example, the betaine compounds of octyl-resorcinol are free from irritating (sour) taste of the parent substance, while the analogous compound of hexyl-resorcinol are at least considerably improved in taste when compared with the parent substance. The new substances have frequently higher melting points than the phenolic components and are mostly decomposed by heating. Generally they are soluble in organic solvents, for example, alcohol, chloroform; however, by treating with water they are sometimes partially split into their components.

The invention is illustrated by the following examples, without being restricted thereto:—

*Example 1.*—7 parts by weight of sarcosine-anhydride are melted on the water bath together with 25 parts by weight of decyl resorcinol. After cooling the mass is pulverized. It has a melting point of about 76° C.

An analogous compound can be obtained if working with the double quantity of sarcosine-anhydride.

*Example 2.*—10 grams of decylresorcinol and 5 grams of anhydrous betaine are dissolved in 20 ccs. of hot alcohol and the solution is evaporated. The residue can easily be pulverized and has a melting point of about 130° C. If only half the quantity of betaine is used, a product is obtained which has a melting point of about 80° C.

The phenolic compounds, used in the above examples, may be replaced by corresponding quantities of other equivalents thereof, for example, heptyl resorcinol, octyl resorcinol (boiling point 183 to 186° C. under 3 mms. pressure), decyl pyrocatechol (boiling point 173 to 175° C. under 3 mms. pressure), decyl pyrogallol (boiling point 220 to 224° C. under 8.5 mms. pressure), phenylethyl resorcinol, 2-methoxy-4-benzylphenol (boiling point 180° C. under 7 mms. pressure) and the like.

We claim:

1. As salt-like complex compounds, the addition compounds of a phenolic compound of the general formula:—

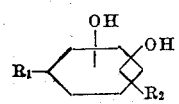

wherein $R_1$ stands for an alkyl group containing 6 to 12 carbon atoms and $R_2$ stands for H or OH, with a basic compound of the group consisting of betaine and sarcosine-anhydride, said products being pulverizable, white to weakly colored, at least nearly tasteless and nonirritant, therapeutically valuable substances which are in general soluble in alcohol and chloroform and can easily be pressed into tablets.

2. As salt-like complex compounds, the addition compounds of an alkyl resorcinol of the probable formula:—

wherein $R_1$ stands for an alkyl group containing 6 to 12 carbon atoms, with a basic compound of the group consisting of betaine and sarcosine anhydride, said products being pulverizable, white to weakly colored, at least nearly tasteless and nonirritant, therapeutically valuable substances which are in general soluble in alcohol and chloroform and can easily be pressed into tablets.

3. The addition compounds of a phenolic compound of the general formula:

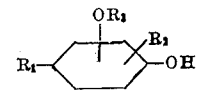

wherein $R_1$ stands for an alkyl or a phenylalkyl radical containing 6 to 12 carbon atoms, and $R_3$ stands for hydrogen or methyl, and $R_2$ stands for hydrogen, hydroxyl or methoxy, with a basic compound of the group consisting of betaine and sarcosine-anhydride, said products being pulverizable, white to weakly colored, nearly tasteless and non-irritant, therapeutically valuable substances which are in general soluble in alcohol and chloroform and can easily be pressed into tablets.

4. The new salt-like complex compound of decyl resorcinol with betaine, said product being a pulverizable, nearly tasteless white substance, non-irritant when applied for medicinal purposes, melting at about 130° C., soluble in alcohol and which product can easily be pressed into tablets.

5. The new salt-like complex compound of decyl resorcinol with sarcosine anhydride, said product being a pulverizable nearly tasteless white substance, non-irritant when applied for medicinal purposes, melting at about 76° C., and which product can easily be pressed into tablets.

In testimony whereof we affix our signatures.

WALTER KROPP.
STANISLAUS DEICHSEL.